Patented Aug. 11, 1936

2,050,974

UNITED STATES PATENT OFFICE 2,050,974

PROCESS OF PREPARING A PURIFIED PYRETHRIN CONCENTRATE

Frederick B. La Forge, Clarendon, Va., and Herbert L. J. Haller, Washington, D. C., dedicated to the free use of the Public in the United States of America No Drawing. Application September 12, 1935, Serial No. 40,288

4 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to the production of insecticides and has for its object the preparation of a pyrethrin-containing concentrate which has to a great extent been freed from the fats, waxes, fatty acids and other substances which are extracted from pyrethrum flowers by organic solvents and which of themselves do not contribute to the insecticidal action of the extract from pyrethrum flowers.

In the processes employed in the preparation of pyrethrum liquid insecticides the usual practice is either to extract pyrethrum flowers with a hydrocarbon solvent such as kerosene or to employ for extraction some other solvent (for example, ethylene dichloride) which is subsequently removed by evaporation to obtain an oleoresin containing the insecticidal principles of the flowers. The oleoresin is then treated with a hydrocarbon solvent to prepare spraying solutions with the desired concentration of insecticidally active materials.

In practice many modifications of these procedures are employed but in all cases the finished products which are obtained and used as insecticides contain relative to the quantities of active materials, that is the pyrethrins, large quantities of fats, waxes, fatty acids, and coloring matter.

These inactive by-products which contaminate the finished product are naturally objectionable because they cause staining of fabrics and contribute needlessly to the weight of concentrates in shipping.

The removal of the above mentioned objectionable impurities from pyrethrum extracts is difficult and tedious by the means heretofore employed and is regarded as commercially impracticable.

By the process herein described it is possible to obtain an oily concentrate with a content varying from 60 to 65 per cent of total pyrethrins which is partially freed of fatty acids and practically free of fats, waxes and coloring matter. The novel feature of the process consists in the application of acetic acid containing a small proportion of water to an oleoresin obtained by extraction of pyrethrum flowers with any suitable volatile solvent.

We have made the observation that an oleoresin of pyrethrum flowers for instance one obtained by the employment of light petroleum ether, and which has the characteristics of a thick dark brown syrup, is practically completely soluble in any proportion in glacial acetic acid. When the proper quantity of acid is employed for solution of the oleoresin and then the proper quantity of water is added under suitable conditions, the fats, waxes and to a certain extent the fatty acids are precipitated while the pyrethrins remain dissolved in the acetic acid. Since, however, the precipitated materials are of semi-solid consistency it is not possible to remove them by filtration at ordinary temperatures. This difficulty is easily overcome by operating at a lowered temperature for instance in the neighborhood of 0° C. at which temperature the precipitated material solidifies and is easily removed by filtration with any suitable type of filter. The acetic acid filtrate containing the insecticidal principle is then partially freed from coloring matter by treatment with a suitable form of carbon. By dilution with a comparatively large quantity of water the acetic acid is removed while the active material being insoluble separates as an oil and is preferably collected in a light petroleum distillate which dissolves the pyrethrins but leaves most of the remaining coloring matter behind. On evaporation of the washed petroleum ether solution the final product is obtained which consists of a light yellow oil with a total pyrethrin content varying from 60 to 65 per cent. This product is completely soluble in kerosene and may be diluted to any desired degree for the preparation of spraying solutions.

To illustrate the application of our process more specifically the following detailed example of the procedure is described:

Five hundred grams of an oleoresin obtained by extraction of pyrethrum flowers with petroleum ether is freed from solvent by warming under reduced pressure and is then dissolved in 750 cc. of glacial acetic acid. The solution is then diluted with a mixture of 750 cc. of acetic acid and 150 cc. of water causing the separation of a semi-solid mass consisting of fats, waxes and other substances.

The solution with the separated material is then cooled by means of ice to about 0° C. at which temperature the insoluble material solidifies and is then removed by filtration on a porcelain funnel. It is necessary to carry out the operation of filtration in such a manner that the low temperature is maintained until the filtration is complete. This is best accomplished by operating in a cold atmosphere. The acetic acid filtrate is then agitated with decolorizing carbon and again filtered. The acetic acid solution containing the pyrethrins is then diluted with about four or five volumes of water and the insoluble oil is dissolved in about two liters of petroleum ether. A dark colored sticky oil remains undissolved and the petroleum ether solution is separated and washed with water. After drying by means of anhydrous sodium sulfate, the solvent is removed by evaporation leaving a light yellow oil which contains from 60 to 65 per cent of total pyrethrins as indicated by analysis and which is completely soluble in kerosene. At the dilutions commonly employed for spraying flies and other household insects the solutions are practically colorless.

The process described is not limited to the employment of the exact proportions of reagent as given and many modifications will suggest themselves. For instance, instead of acetic acid, its homologs which are liquid at ordinary temperature and which are miscible with water, such as formic or propionic acid, may be employed. Also various types of filters and other apparatus may be employed where necessary in large scale operations. Instead of employing the operation of filtration it is also possible to separate the acid solution from its separated material by other means such as decantation of the liquid phase.

Having thus described our invention, we claim:

1. A process for preparing a product rich in active principles from pyrethrum oleoresin comprising the solution of the pyrethrum oleoresin in a liquid water-miscible organic acid having the general empirical formula $C_nH_{2n+1}COOH$, the addition of a small quantity of water to the acid solution to precipitate inactive material, the removal of the inactive material mechanically and the separation of the concentrated active material from the acid solution by addition of a large proportion of water.

2. A process for preparing a concentrate containing the active principles of pyrethrum flowers which comprises dissolving the oleoresin of pyrethrum flowers previously obtained by extraction with an organic solvent, in glacial acetic acid, precipitating fats, waxes and coloring matter by the addition of a small quantity of water, filtering off the precipitate and separating the pyrethrin concentrate from the acid solution by the further addition of water.

3. A process for preparing a concentrate containing the active principles of pyrethrum flowers which comprises dissolving about 500 gms. of the oleoresin of pyrethrum flowers in about 750 cc. glacial acetic acid, precipitating fats, waxes and coloring matter by the addition of a solution of about 750 cc. glacial acetic acid and about 150 cc. water, removing the precipitate and separating the pyrethrin concentrate from the acid solution by the further addition of water.

4. The process of preparing a purified pyrethrin concentrate which comprises extracting pyrethrum flowers with an organic solvent, dissolving the resulting oleoresin in glacial acetic acid, adding water in a sufficient quantity to precipitate the contained fats, waxes and coloring matter, filtering off the precipitate and separating the pyrethrin concentrate from the acid solution by the further addition of water.

FREDERICK B. LA FORGE.
HERBERT L. J. HALLER.